United States Patent
Kline et al.

(10) Patent No.: US 10,894,542 B2
(45) Date of Patent: Jan. 19, 2021

(54) DRIVING FEEDBACK BASED SAFETY SYSTEM

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN); Richard B. Finch, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/174,459

(22) Filed: Oct. 30, 2018

(65) Prior Publication Data

US 2020/0130688 A1    Apr. 30, 2020

(51) Int. Cl.
*B60W 30/14* (2006.01)
*B60W 40/09* (2012.01)
*G07C 5/00* (2006.01)
*B60W 50/12* (2012.01)
*B60W 40/06* (2012.01)

(52) U.S. Cl.
CPC .......... *B60W 30/146* (2013.01); *B60W 40/06* (2013.01); *B60W 40/09* (2013.01); *B60W 50/12* (2013.01); *G07C 5/008* (2013.01)

(58) Field of Classification Search
CPC .... B60W 30/146; B60W 40/06; B60W 40/09; B60W 50/12; G07C 5/008
See application file for complete search history.

(56) References Cited

U.S. PATENT DOCUMENTS

| | | | | |
|---|---|---|---|---|
| 4,882,693 | A * | 11/1989 | Yopp | B62D 5/00 701/37 |
| 5,835,008 | A * | 11/1998 | Colemere, Jr. | B60Q 1/441 340/439 |
| 7,798,578 | B2 * | 9/2010 | Lewis | B60W 30/18127 303/151 |
| 9,081,650 | B1 * | 7/2015 | Brinkmann | G07C 5/0808 |
| 9,390,062 | B1 * | 7/2016 | Ashton | G07C 5/008 |
| 9,783,109 | B2 | 10/2017 | Keaveny et al. | |
| 9,805,601 | B1 * | 10/2017 | Fields | G08G 1/096844 |
| 9,827,811 | B1 * | 11/2017 | McNew | B60N 2/90 |
| 10,042,359 | B1 * | 8/2018 | Konrardy | G05D 1/0255 |
| 10,166,994 | B1 * | 1/2019 | Fields | B60W 30/06 |

(Continued)

OTHER PUBLICATIONS

Anonymously Disclosed, IP.com, "Cognitive Driving Planner", IPCOM000247604D, IP.com, Sep. 19, 2016, pp. 1-6.
(Continued)

*Primary Examiner* — Babar Sarwar
(74) *Attorney, Agent, or Firm* — Tihon Poltavets

(57) ABSTRACT

A method includes, responsive to determining a vehicle is operational, receiving vehicle data associated the operational vehicle. The method receives driver data associated with a driver of the operational vehicle. The method receives environmental data associated with a location for the operational vehicle. The method calculates a drivability score based on the vehicle data, the driver data, and the environmental data, wherein the drivability score is a measure of optimal driving conditions. Responsive to determining the drivability score is below a drivability score threshold, the method performs an action based on the drivability score.

17 Claims, 4 Drawing Sheets

(56) References Cited

U.S. PATENT DOCUMENTS

| | | | | |
|---|---|---|---|---|
| 10,189,479 | B2* | 1/2019 | Innes | B60W 40/09 |
| 10,259,466 | B2* | 4/2019 | Memani | B60W 40/09 |
| 10,493,994 | B1* | 12/2019 | Fields | G08G 1/0112 |
| 2009/0024419 | A1* | 1/2009 | McClellan | G06Q 40/08 705/4 |
| 2009/0234552 | A1* | 9/2009 | Takeda | B60W 40/09 701/96 |
| 2012/0022764 | A1* | 1/2012 | Tang | B60W 30/1882 701/102 |
| 2012/0221216 | A1* | 8/2012 | Chauncey | B60W 50/14 701/51 |
| 2013/0018677 | A1* | 1/2013 | Chevrette | G06Q 40/08 705/4 |
| 2013/0046449 | A1* | 2/2013 | Yucel | F16H 61/0213 701/51 |
| 2013/0332402 | A1* | 12/2013 | Rakshit | G01C 21/3453 706/46 |
| 2014/0107894 | A1 | 4/2014 | Obradovich | |
| 2014/0236466 | A1* | 8/2014 | Doron | G06Q 10/06 701/123 |
| 2014/0277932 | A1* | 9/2014 | Prakah-Asante | H04M 1/6091 701/36 |
| 2015/0294422 | A1* | 10/2015 | Carver | G06Q 40/08 705/4 |
| 2015/0379784 | A1 | 12/2015 | Gotz et al. | |
| 2016/0039426 | A1* | 2/2016 | Ricci | G01C 21/3691 701/1 |
| 2016/0042644 | A1* | 2/2016 | Velusamy | G08G 1/0112 340/435 |
| 2016/0059733 | A1* | 3/2016 | Hettrich | H04W 4/029 701/2 |
| 2016/0110650 | A1* | 4/2016 | Basir | G06N 20/00 706/14 |
| 2016/0117928 | A1* | 4/2016 | Hodges | G08G 1/0967 701/99 |
| 2016/0198306 | A1* | 7/2016 | Miles | G06Q 10/0639 455/456.3 |
| 2017/0057411 | A1* | 3/2017 | Heath | B60W 40/09 |
| 2017/0057518 | A1* | 3/2017 | Finegold | H04M 1/725 |
| 2017/0206717 | A1* | 7/2017 | Kuhnapfel | G09B 19/167 |
| 2017/0287232 | A1* | 10/2017 | Devdutt | G06F 16/951 |
| 2017/0305434 | A1* | 10/2017 | Ratnasingam | B60W 40/09 |
| 2017/0323244 | A1* | 11/2017 | Rani | G06Q 10/06393 |
| 2017/0365169 | A1* | 12/2017 | Tennent | G08G 1/0145 |
| 2018/0053103 | A1* | 2/2018 | Delgado | G06N 5/04 |
| 2018/0113461 | A1* | 4/2018 | Potnis | B60W 50/00 |
| 2018/0174457 | A1* | 6/2018 | Taylor | G06N 20/00 |
| 2018/0196427 | A1* | 7/2018 | Majumdar | G05D 1/0088 |
| 2018/0225894 | A1* | 8/2018 | Mays | G06Q 10/06398 |
| 2018/0257560 | A1* | 9/2018 | Kapuria | B60W 50/16 |
| 2018/0257561 | A1* | 9/2018 | Kapuria | H04N 5/372 |
| 2018/0257564 | A1* | 9/2018 | Kapuria | B60R 1/00 |
| 2018/0300816 | A1* | 10/2018 | Perl | G06Q 40/08 |
| 2018/0319402 | A1* | 11/2018 | Mills | B60W 30/10 |
| 2019/0100216 | A1* | 4/2019 | Volos | G01S 19/42 |
| 2019/0187691 | A1* | 6/2019 | Magzimof | B60T 7/16 |
| 2019/0196465 | A1* | 6/2019 | Hummelshoj | G05D 1/0038 |
| 2019/0213684 | A1* | 7/2019 | Sundar Singh | H04W 4/42 |
| 2019/0241198 | A1* | 8/2019 | Mori | B60W 50/14 |
| 2019/0278263 | A1* | 9/2019 | Mason | B60W 40/09 |
| 2019/0283672 | A1* | 9/2019 | Daman | B60K 37/06 |
| 2019/0375394 | A1* | 12/2019 | Maleki | B60W 10/10 |
| 2020/0031361 | A1* | 1/2020 | Soliman | B60W 50/16 |
| 2020/0031364 | A1* | 1/2020 | Payne | B60W 50/0098 |
| 2020/0031371 | A1* | 1/2020 | Soliman | B60W 40/09 |
| 2020/0072637 | A1* | 3/2020 | Guidotti | G01C 21/3461 |
| 2020/0074757 | A1* | 3/2020 | Mezaael | G07C 5/085 |
| 2020/0090426 | A1* | 3/2020 | Barnes | G06N 5/025 |

OTHER PUBLICATIONS https://driversed.com/driving-information/driving-conditions/adverse-we . . . , "Adverse Weather Conditions", printed Oct. 30, 2018, pp. 1-4.

Hjelkrem et al., "Driver Behavior Data Linked With Vehicle, Weather, Road Surface, and Daylight Data", https://www.ncbi.nlm.nih.gov/pmc,/articles/PMC5199149/, Dec. 21, 2016, pp. 1-4.

Jagerbrand et al., "Effects of Weather Conditions, Light Conditions, and Road Lighting on Vehicle Speed", Apr. 23, 2016, pp. 1-28.

Kilpelainen et al., "Effects of Weather and Weather Forecasts on Driver Behavior", ResearchGate, Jul. 2007, pp. 1-13.

* cited by examiner

DRIVING FEEDBACK BASED SAFETY SYSTEM

FIELD OF INVENTION

This disclosure relates generally to driving safety systems, and in particular to feedback based driving safety systems.

BACKGROUND OF THE INVENTION

During instances of inclement weather, road conditions can deteriorate rapidly and such a rapid deterioration of road conditions may not always be apparent to an operator of a vehicle. For example, if the operator of a vehicle is driving at a low altitude in rain conditions and begins to gain altitude as the road climbs a steep grade, the rain conditions can begin to change over into snow and ice conditions. Further complicating the situation, the operator of the vehicle may not be fully aware of the operational capabilities of the vehicle and whether or not the vehicle is properly configured to handle such a rapid deterioration of road conditions.

SUMMARY

Embodiments in accordance with the present invention disclose a method, computer program product and computer system for a driving feedback safety system, the method, computer program product and computer system can responsive to determining a vehicle is operational, receive vehicle data associated the operational vehicle. The method, computer program product and computer system can receive driver data associated with a driver of the operational vehicle. The method, computer program product and computer system can receive environmental data associated with a location for the operational vehicle. The method, computer program product and computer system can calculate a drivability score based on the vehicle data, the driver data, and the environmental data, wherein the drivability score is a measure of optimal driving conditions. The method, computer program product and computer system can responsive to determining the drivability score is below a drivability score threshold, perform an action based on the drivability score.

DETAILED DESCRIPTION

Embodiments of the present invention allow for a driving feedback safety system that is capable of performing an action on an operational vehicle. Embodiments of the present invention utilize a drivability score based on vehicle data, driver data, and environmental data, to determine an action (e.g., limit maximum speed) to perform on the operational vehicle, where the drivability score is a measure of optimal driving conditions. Performing an action on the operational vehicle provides an additional level of safety for instances of dangerous situations that are not always apparent to a driver of the vehicle. Such situations include, rapid deterioration of weather conditions, driving capabilities of surrounding vehicles, driving capabilities of the driver operating the vehicle, and driving capabilities of the vehicle due to one or more components not being in an optimal state (e.g., worn tires).

Figure 1:
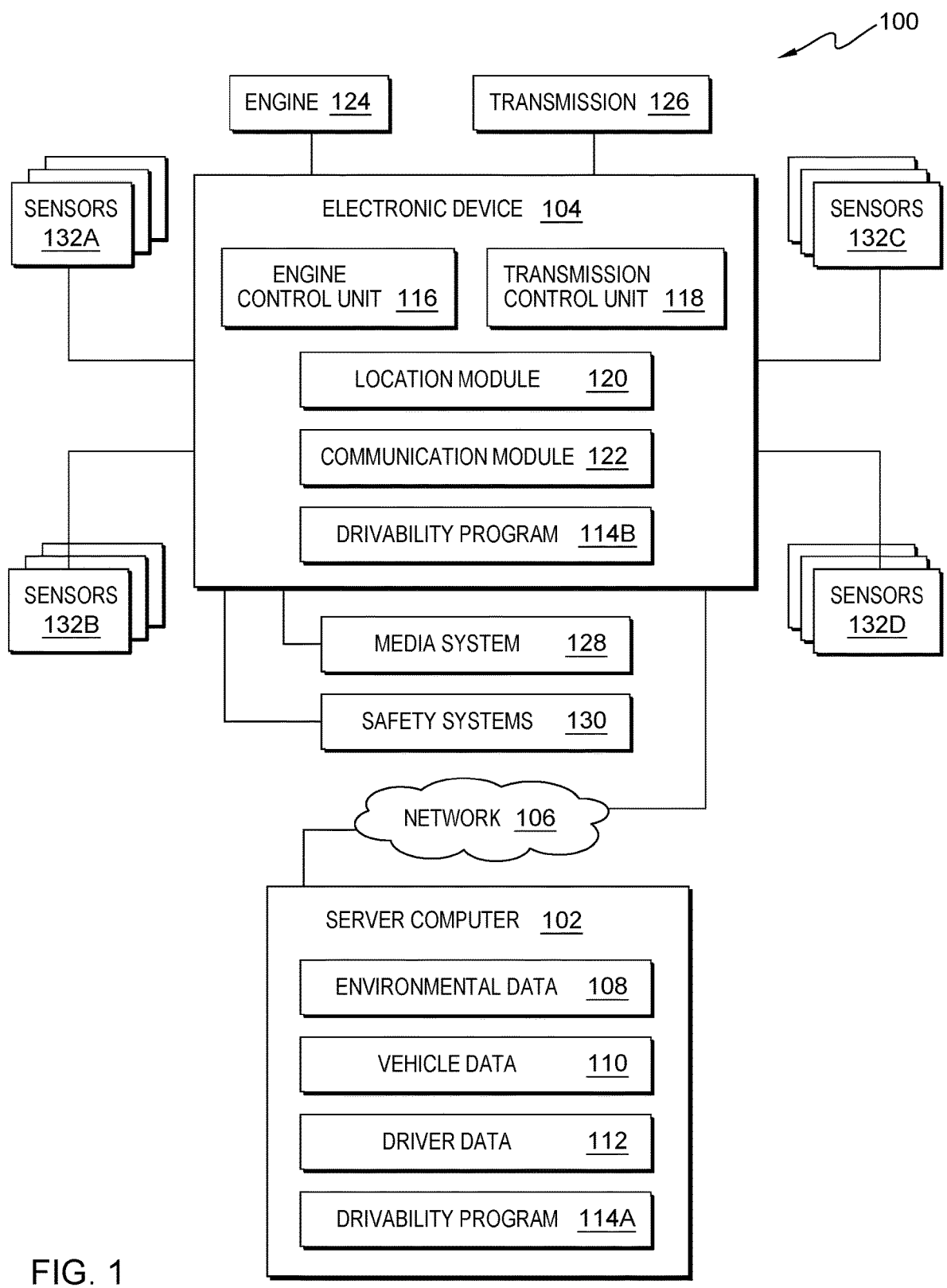
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and electronic device 104 all interconnected over network 106. For discussion purposes, drivability program 114 can operate on server side as drivability program 114A on server computer 102 or user side as drivability program 114B on electronic device 104.

Server computer 102 may be a desktop computer, a laptop computer, a tablet computer, a specialized computer server, a smartphone, or any computer system capable of executing the various embodiments of drivability program 114A. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information. Server computer 102 includes environmental data 108, vehicle data 110, driver data 112, and drivability program 114A. In this embodiment, drivability program 114A represents a server side based drivability program 114.

Electronic device 104 may be a microprocessor, a microcontroller, or any computing device capable of integrating functions of engine control unit (ECU) 116, transmission control unit (TCU) 118, location module 120, communication module 122, and drivability program 114B. Alternatively, ECU 116, TCU 118, location module 120, communication module 122, and drivability program 114B each operate independently without electronic device 104 utilizing a Controller Area Network (CAN bus). Electronic device 104 can include a user interface to allow for a user (i.e., vehicle operator) to communication with driver ability program 114B. In this embodiment, drivability program 114B represents a user side (i.e., vehicle operator) based drivability program 114. In general, electronic device 104 is representative of any programmable electronic device or combination of programmable electronic devices capable of executing machine-readable program instructions and communicating with users of other electronic devices via network 106. Electronic device 104 may include components, as depicted and described in further detail with respect to FIG. 4, in accordance with embodiments of the present invention.

In general, network 106 can be any combination of connections and protocols that will support communications between server computer 102 and electronic device 104. Network 106 can include, for example, a local area network (LAN), a wide area network (WAN), such as the internet, a cellular network, or any combination of the preceding, and can further include wired, wireless, and/or fiber optic connections. In one embodiment, drivability program 114A can be a web service accessible via network 106 to a user of electronic device 104. In another embodiment, drivability program 114A may be operated directly by a user of server computer 102.

Environment data 108 includes any weather condition information and road condition information, where environmental data 108 is freely available or accessible via a subscription based service. Weather condition information includes but is not limited to wind speed, type of precipitation, precipitation rates, humidity levels, dew point temperature, ambient temperature, and visibility distances. Environment data 108 can also include warnings (e.g., winter storm warning or tornado warning) issued by an agency, such as the National Weather Service (NWS), relating to extreme or hazardous related weather events. Road condition information includes but is not limited to road surface condition (e.g., potholes, ice), traffic information, accident information, debris information (e.g., fallen tree), disabled vehicle, and road works. Drivability program 114 has the ability to ability to receive and analyze environment data 108 in order to calculate a drivability score.

Vehicle data 110 includes baseline vehicle information on which drivability program 114B operates. Vehicle data 110 include brake distances in the dry and wet with no payload, brake distances in the dry and wet with max payload, oil fluid change interval, transmission fluid change interval, brake fluid change interval, and wading depth. Driver data 112 include information pertaining to an operator of the vehicle. Driver data 112 includes but is not limited to an amount of years the operator has held a license to operate a vehicle, types of licenses held by the operator (e.g., Basic Automobile License, Commercial Driver's License (CDL)), any previous accident information, and any previously issued traffic violations. Drivability program 114 has the ability to ability to receive and analyze vehicle data 110 and driver data 112 in order to calculate a drivability score.

ECU 116, also known as an engine control module (ECM), is an electronic device that controls and monitors various actuators of engine 124. ECU 116 utilizes a software component capable of controlling and monitoring performance output and operation parameters of engine 116. TCU 118 is an electronic device that controls and monitors various parameters of transmission 126. Similar to ECU 116, TCU 118 utilizes a software component capable of controlling and monitoring performance output and operational parameters of transmission 126. Location module 120 allows for drivability program 114B to identify a location of a vehicle with electronic device 104. In this embodiment, location module 120 is a Global Positioning System (GPS) that drivability program 114B utilizes to monitor a location for the vehicle. Communication module 122 allows for drivability program 114B to communicate with server computer 102, via network 106 to receive environmental data 108, vehicle data 110, and driver data 112 for calculating a drivability score. In this embodiment, communication module 122 allows for drivability program 114B to communicate with drivability program 114A on server computer 102, via network 106.

Media system 128 represents an audio and/or visual based electronic system capable of relaying information from drivability program 114B to an operator of the vehicle. Additionally, media system 128 has the ability to display navigation information and audibly play music, navigation information, and information produced by safety system 130. Safety systems 130 include but is not limited to parking sensors, blind spot monitoring sensors, sensor based lane keeping, radar based cruise control, light sensors, and rain sensors. Sensors 132A, 132B, 132C, and 132D, represent one or more sensors for monitoring various parameters at each wheel of the vehicle, where the vehicle has a total of four wheels. Sensors 132A, 132B, 132C, and 132D have the ability to monitor brake pad depth, brake bad temperature, brake rotor width, brake rotor temperature, brake fluid temperature, tire inflation pressure, and tire rotational speed for utilization by an anti-lock braking system (ABS) and an electronic stability control system (ECS). Furthermore, drivability program 114B utilizes variations in tire rotation speed at different points in times to calculate changes in tire tread depth, since a tire with a more tread depth has a greater diameter than a tire with less tread depth.

Figure 2:
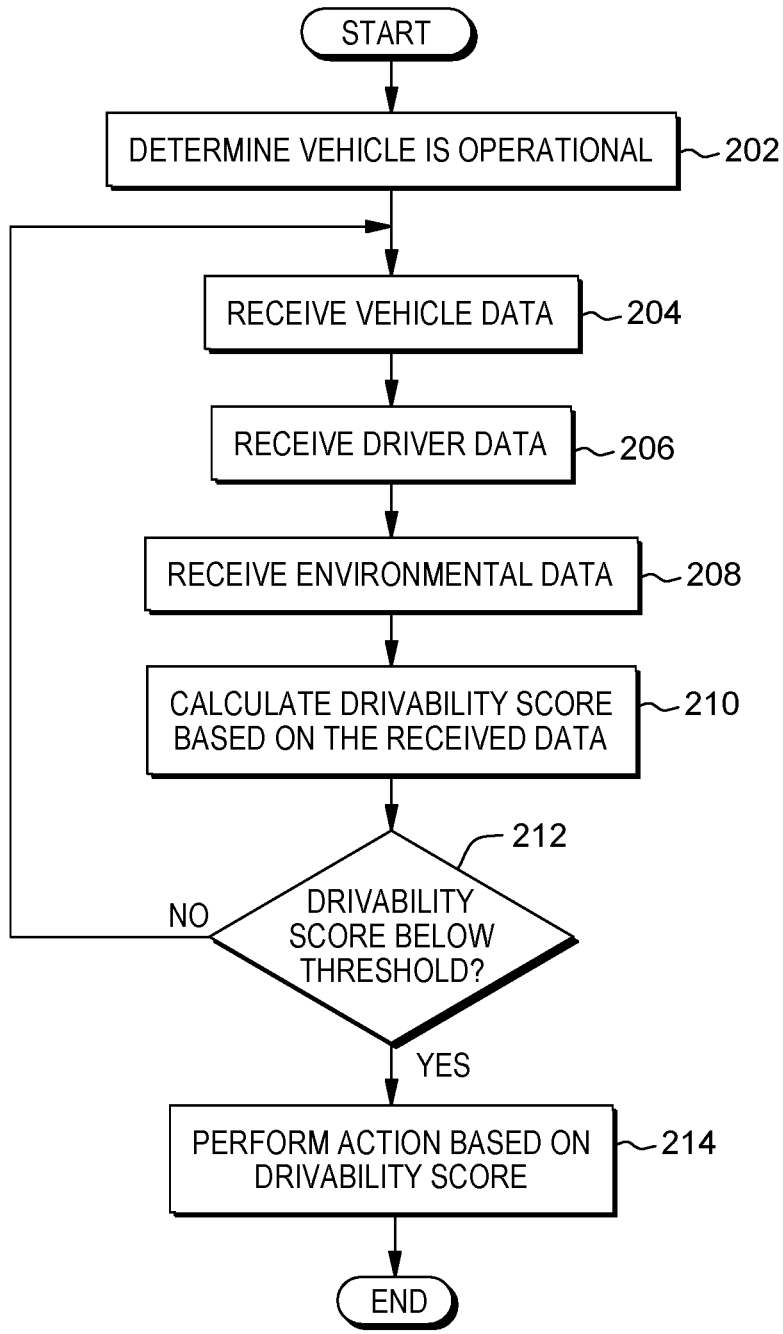
FIG. 2 is a flowchart depicting operational steps of a drivability program for calculating and evaluating a drivability score, in accordance with an embodiment of the present invention.

FIG. 2 is a flowchart depicting operational steps of a drivability program for calculating and evaluating a drivability score, in accordance with an embodiment of the present invention Drivability program 114 determines (202) a vehicle is operational. In this embodiment, drivability program 114 determines a vehicle is operational when an operator (i.e., driver) with a key transponder corresponding to the vehicle is present within a cabin of the vehicle and the operator initializes a startup procedure. The startup procedure can include the operator turning a key in an ignition switch or pressing an ignition switch (i.e., push button start). In another embodiment, drivability program 114 determines a vehicle is operational when an operator shifts transmission 126 of the vehicle from a parked state or neutral state into a drive state or reverse state, where drive state includes a selection of a forward propelling gear. In yet another embodiment, drivability program 114 determines a vehicle is operational when one or more of sensors 132A, 132B, 132C, and 132D detect that at least one wheel is rotating.

Drivability program 114 receives (204) vehicle data. In this embodiment, drivability program 114 receives vehicle data to establish a baseline score based on fixed parameters associated the particular vehicle being operated. The fixed parameters include a year, make, and model for the vehicle. Drivability program 114 can establish a higher baseline score for a newer vehicle (e.g., 1-3 years old) compared to an older vehicle (e.g., 7+ years old), since a newer vehicle is more likely to have additional standard safety features (e.g., automatic brake assist) previously unavailable on older vehicles. Drivability program 114 can establish a higher baseline score for a particular vehicle make and model in a sports sedan category compared to another vehicle make and model in a large sport utility vehicle (SUV) category, since a larger SUV typically has a longer stopping distance in dry and wet conditions.

In other embodiments, drivability program 114 sources additional information upon receiving the fixed parameters. For example, the vehicle data can include brake distances in the dry and wet with no payload, brake distances in the dry and wet with max payload, oil fluid change interval, transmission fluid change interval, brake fluid change interval, and wading depth. Drivability program 114 can source this information directly from a manufacturer or from an independent group that tests and records such vehicle data for each year, make, and model of a vehicle. Vehicle data can further include service intervals for particular components and fluids on the vehicle based on the year, make, and model of the vehicle. The service intervals can include age limits for brake fluid, utilization distance and age for engine oil, utilization distance and age for transmission fluid, utilization and age for manufacturer installed tires, and age of front and rear window wipers.

Drivability program 114 receives (206) driver data. In this embodiment, drivability program 114 received driver data that includes a driving record for the operator of the vehicle. As previously discussed, driver data can include an amount of years the operator has held a license to operate a vehicle, types of licenses held by the operator (e.g., Basic Automobile License, Commercial Driver's License (CDL)), any previous accident information, and any previously issued traffic violations. Drivability program 114 utilizes driver data, along with vehicle data, to establish a baseline for the drivability score, prior to calculating a drivability score based on environmental data. Drivability program 114 can establish a higher baseline drivability score for a vehicle operator who has more driving experience (e.g., x>5 years) than a vehicle operator who has less driving experience (e.g., x<1 year). Drivability program 114 can establish a higher baseline drivability score for a vehicle operator who holds multiple classes (e.g., Commercial Driver's License (CDL)), Track Group Based License) of drivers licenses than a vehicle operator who holds a single class of driver license. Drivability program 114 can establish a higher baseline drivability score for a vehicle operator with no previously issued traffic violations compared to a vehicle operator with multiple traffic violations, such as speeding, aggressive driving, reckless driving, unsafe lane change, failure to keep a lane, and failure to maintain a safe distance.

Drivability program 114 receives (208) environmental data. In this embodiment, drivability program 114 receives environmental data from both freely available sources and a subscription based service. As previously discussed, weather condition information includes but is not limited to wind speed, type of precipitation, precipitation rates, humidity levels, dew point temperature, ambient temperature, and visibility distances. Environment data can also include warnings (e.g., winter storm warning or tornado warning) issued by an agency, such as the National Weather Service (NWS), relating to extreme or hazardous related weather events. Road condition information includes but is not limited to road surface condition (e.g., potholes, ice), traffic information, accident information, debris information (e.g., fallen tree), disabled vehicle, and road works. Drivability program 114 has the ability to receive this environment data, parse the environmental data using a language processor, and identify key aspects of environmental data for utilization in calculating the drivability score.

Drivability program 114 calculates (210) a drivability score based on the received data. In this embodiment, drivability program 114 establishes a baseline drivability score based on the received vehicle data and the driver data, prior to any movement of the vehicle. The vehicle data include fixed parameters and variable parameters, where the fixed parameters remain constant for a period of utilization of the vehicle and the variable parameters vary for the period of utilization of the vehicle. Drivability program 114 calculates a drivability score based on the fixed parameters of the vehicle data, such as a year, make, model, and options of the vehicle. Drivability program 114 can assign a higher score (e.g., 100-95) for a newer vehicle (e.g., 2019 model year) which includes all the latest safety features (e.g., electronic stability control, pedestrian detection, forward collision warning, automatic wipers). Drivability program 114 can assign a lower score (e.g., 70-75) for an older vehicle (e.g., 1987 model year) which does not include any basic safety features (e.g., anti-lock brake system, disk brakes). Alternatively, drivability program 114 can utilize testing data for various vehicles to calculate a baseline score since handling and safety characteristics of a newer vehicle may not always exceed those of an older vehicle. For example, based on available testing data, a new version of vehicle A with safety options B might handle as well as an older version of vehicle A with the same safety options B, due to changes in suspension components between the two versions. As a result, drivability program 114 calculates a higher baseline drivability score for the older version of vehicle A (e.g., 85) compared to the newer version of vehicle A (e.g., 83).

In this embodiment, drivability program 114 subsequently calculates a drivability score based on the variable parameters, where drivability program 114 alters the previously established drivability score utilizing the fixed variables based on the variable parameters. Variable parameters can include tire type, tire speed rating, tire tread depth, brake pad type, brake pad depth, and brake fluid age. For tire type, drivability program 114 assigns +1 to the drivability score for premium all-season tires and assigns +0 to the drivability score for OEM standard tires. Additionally, based on a driving location and time of year, drivability program 114 assigns +3 to the drivability score for summer tires during the months of May-August and assigns −3 to the drivability score for winter tires during the same interval of May-August. Similarly, drivability program 114 assigns +3 to the drivability score for winter tires during the months of November-March and assigns −3 to the drivability score for summer tires during the same interval of November-March.

For tire speed rating, drivability program 114 assigns +1 to the drivability score for a tire speed category in the range of Q through Y(Z) and assigns −1 to the drivability score for a tire speed category in the range of L through P, which includes tires such as temporary spares. For tire tread depth, drivability program 114 assigns +2 to the drivability score for a new to slightly used tire depth (e.g., $12/32$nds to $9/32$nds inch) and assigns −2 to the drivability score for a worn or bald tire (e.g., $2/32$nds to $0/32$nds inch). Drivability program 114 assigns +2 through −2 to the drivability score based on the amount of tire depth remaining on the tire. Additionally, based on a driving location and time of year, drivability program 114 assigns −4 to the drivability score for a worn or bald tire during the winter months of November-March, since drivability of the vehicle with worn tires in snow or sleet is worse than drivability of the vehicle with worn tires in dry summer weather.

For brake pad type, drivability program 114 assigns +1 to the drivability score for an OEM or premium heat resistant brake pad type and assigns −1 to the drivability score for a non-OEM or economy based brake pad type. For brake pad depth, drivability program 114 assigns +2 to the drivability score for a new to slightly used brake pads (e.g., 10-8 mm) and assigns −2 to the drivability score for a worn brake pads (e.g. 2-0 mm). For brake fluid age, drivability program 114 assigns +2 to the drivability score for new to slightly used brake fluid (e.g., 0 months to 24 months or <30k miles) and assigns +2 to the drivability score for old and heavily used brake fluid (e.g., 24 months to 60 months or >30k miles).

For driver data, drivability program 114 calculates a drivability score based on the but not limited to an amount of years the operator (i.e., driver) has held a license to operate a vehicle, types of licenses held by the operator (e.g., Basic Automobile License, Commercial Driver's License (CDL)), any previous accident information, and any previously issued traffic violations. For an amount of years the operator has held a license to operate the vehicle, drivability program 114 assigns +1 to the drivability score for every 3 years of experience the operator of the vehicle has. For example, for 9 years of the operator holding a license, drivability program 114 assigns +3 to the drivability score. For types of license held by the operator, drivability program 114 assigns +1 to the drivability score based on a number of license held (e.g., two) and a type of vehicle the driver is operating (e.g., large moving van). Since, certain large vehicles such as cargo vans and small box trucks don't require a special license for operation, a driver holding a Commercial Driver's License (CDL) would have a greater knowledge of operating a larger vehicle compared to a driver only holding a Basic Automobile License.

For any previous accident or traffic violation, drivability program 114 assigns a score based on fault and severity of the accident and type of traffic infraction by the driver of the vehicle. For a minor accident where the driver of the vehicle was at fault, drivability program 114 assigns a −1 to the drivability score but for a minor accident where the driver of the vehicle was not at fault, drivability program 114 assigns +0 to the drivability score. For a major accident (i.e., total vehicle loss) where the driver of the vehicle was at fault, drivability program 114 assigns a −3 to the drivability score but for a major accident where the driver of the vehicle was not at fault, drivability program 114 assigns +0 to the drivability score. For a minor traffic infraction (e.g., speeding <5 mph over) drivability program 114 assign a −1 to the drivability score but for a major traffic infraction (e.g., speeding >15 mph over, reckless driving) drivability program 114 assigns a −4 to the drivability score.

For environment data, drivability program 114 calculates a drivability score based on exogenous items or events. As previously discussed, environmental data includes weather condition information such as wind speed, type of precipitation, precipitation rates, humidity levels, dew point temperature, ambient temperature, and visibility distances. The environment data can also include warnings (e.g., winter storm warning or tornado warning) issued by an agency, such as the National Weather Service (NWS), relating to extreme or hazardous related weather events. Road condition information includes but is not limited to road surface condition (e.g., potholes, ice), traffic information, accident information, debris information (e.g., fallen tree), disabled vehicle, and road works. Drivability program 114 has the ability to ability to analyze the environment data in order to calculate or update a drivability score. Environmental data can also include information pertaining to surrounding drivers and vehicles (e.g., speed of surrounding vehicles, drivability score of surrounding vehicles), where drivability program 114 alters the drivability score based on one or more drivability scores for vehicles in the surrounding area.

In one example, drivability program 114 receives environment data that includes a Winter Storm Warning with an effective start time of 7 PM, 31° F. temperature, and a NW wind of 18 mph. Drivability program 114 analyzes the environment data and if drivability program 114 determines the current time is 4 pm, where the Winter Storm Warning does not go into effect for another 3 hours. As a result, drivability program assigns +0 to the drivability score. Alternatively, 114 analyzes the environment data and if drivability program 114 determines the current time is 7:30 pm, drivability program assigns −5 to the drivability score. For a 31° F. temperature, drivability program 114 assigns a −2 to the drivability score due to the increased likelihood of ice on the roads ways. For a NW wind of 18 mph, drivability program assigns −1 to the drivability score, due to the wind being in a 30 mph>x>15 mph range for assigning a −1 to the drivability score.

In another example, drivability program 114 receives environment data that includes a Flash Flood Warning, a 3-4 in./hr. precipitation rate, an SE wind of 43 mph, and visibility of ¼ mile due to fog. For the Flash Flood Warning, drivability program 114 assigns +0 to the drivability score because a Flash Flood Warning does not have an immediate impact on the drivability of the vehicle. However, drivability program 114 has the ability to display the Flash Flood Warning to the driver of the vehicle when displaying the drivability score, which is discussed in further detail with regards to 312 in FIG. 3. For 3-4 in./hr. precipitation rate, drivability score 114 assigns a −2 to the drivability score, responsive to determining the vehicle data specifies that the vehicle has automatic wipers for automatically adjusting to the precipitation rate. Additionally, drivability score 114 assigns a −4 to the drivability score, responsive to determining the vehicle data specifies that the vehicle does not have automatic wipers. For a SE wind of 43 mph, drivability program assigns −2 to the drivability score, due to the wind being in a 45 mph>x>30 mph range for assigning a −2 to the drivability score. For visibility of ¼ mile due to fog, drivability program 114 assigns a −15 to the drivability score, due to the visibility limitations caused by the fog.

Drivability program 114 calculates the final drivability score from all value assignments (e.g., +1, −4) to the drivability score based on the vehicle data, driver data, and the environmental data. In this embodiment, a maximum drivability score is 100 and a minimum drivability score is 30, where a drivability score threshold is 70. The drivability score threshold represents a drivability score for which drivability program 114 performs an action in response to a lowered drivability score due to one or more of the vehicle data, driver data or environmental data. In one example, if vehicle started with a baseline drivability score of 85 based on the vehicle data and the driver data, and drivability program 114 calculated a final drivability score of 63 due to the environment data, there is a 25.9% reduction in driving capabilities with relation to the baseline drivability score rather than the maximum drivability score (i.e., 100). In another example, if vehicle started with a baseline drivability score of 95 based on the vehicle data and the driver data, and drivability program 114 calculated a final drivability score of 82 due to the environment data, there is a 13.7% reduction in driving capabilities with relation to the baseline drivability score rather than the maximum drivability score.

Drivability program 114 determines (212) whether the drivability score is below a threshold value. In the event drivability program 114 determines the drivability score is below a threshold ("yes" branch, 212), drivability program 114 performs (214) an action based on the drivability score. In the event drivability program 114 determines the drivability score is not below a threshold ("no" branch, 212), drivability program 114 reverts back to receiving (204) vehicle data. Alternatively, drivability program 114 can revert back to receiving (208) environmental data since the operational status of the vehicle has not changed and the operator (i.e., driver) of the vehicle is constant.

Drivability program 114 performs (214) an action based on the drivability score. In this embodiment, drivability program 114 performs an action on one or more components of the vehicle. The action on the one or more components of the vehicle includes determining to limit a volume of a media system, determining to limit a maximum speed of the vehicle to a particular speed (e.g., 45 mph), determining to increase sensitivity of the safety systems on the vehicle, activating the vehicles headlights, activating the vehicles fog lights, and determining to close all windows. Performing an action can also include displaying the drivability score to the driver via the media system on the vehicle, along with any vehicle data (e.g., low tire pressure) and/or environment data (e.g., Flash Flood Warning) related messages. Details of drivability program 114 performing an action based on the drivability score are discussed in further detail with regards to FIG. 3.

Figure 3:
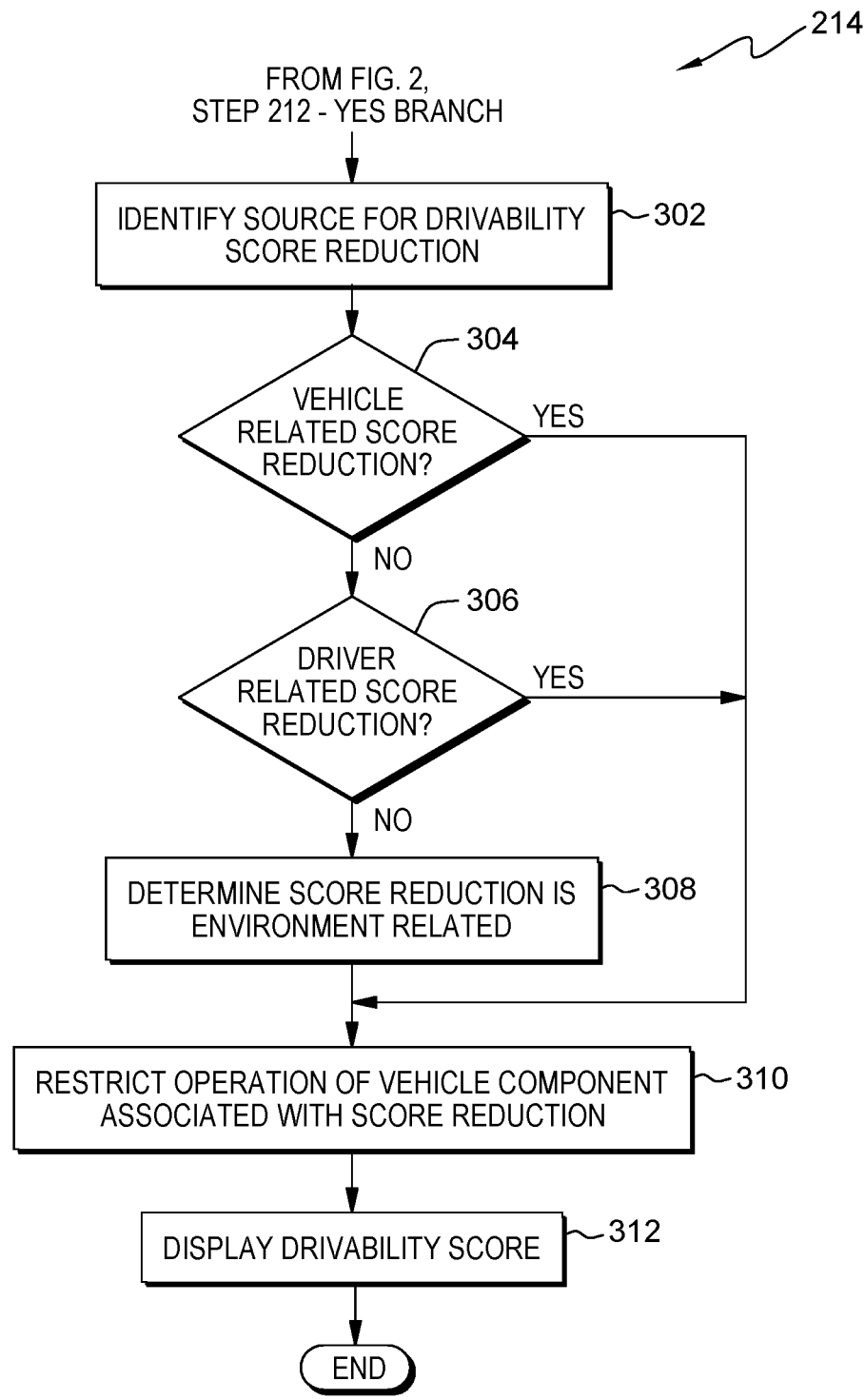
FIG. 3 is a flowchart depicting operational steps of performing an action on an operational vehicle based on a calculated drivability score, in accordance with an embodiment of the present invention.

FIG. 3 is a flowchart depicting operational steps of performing an action on an operational vehicle based on a calculated drivability score, in accordance with an embodiment of the present invention.

Drivability program 114 identifies (302) a source for the drivability score reduction. Sources for drivability score reduction represent every instance where drivability program 114 assigned a value of x<+0 to the drivability score. Drivability program 114 calculates a total reduction for the reduced drivability score by combining the drivability score reduction for each category of vehicle data, driver data, and environmental data. In one example, drivability program 114 calculates a total reduction of 36 points, where 16 points were vehicle related, 0 points where driver related, and 20 points where environmental related. In this example, the score reduction is environmental related due to a 55.6% drivability score reduction occurring due to environmental reasons. In another example, drivability program 114 calculates a total source reductions of 42 points, where 5 points were vehicle related, 20 points where driver related, and 17 points where environmental related. In this example, the score reduction is driver related due to a 47.6% drivability score reduction occurring due to driver reasons.

Drivability program 114 determines (304) whether the source for the drivability score reduction is a vehicle related score reduction. In the event drivability program 114 determines the source for the drivability score reduction is not a vehicle related score reduction ("no" branch, 304), drivability program 114 determines (306) whether the source for the drivability score reduction is a driver related score reduction. In the event drivability program 114 determines the source for the drivability score reduction is a vehicle related score reduction ("yes" branch, 304), drivability program 114 restricts (310) operation of a vehicle component associated with the score reduction.

Drivability program 114 determines (306) whether the source for the drivability score reduction is a driver related score reduction. In the event drivability program 114 determines the source for the drivability score reduction is not a driver related score reduction ("no" branch, 304), drivability program 114 determines (308) the score reduction is environmental related. In the event drivability program 114 determines the source for the drivability score reduction is a driver related score reduction ("yes" branch, 304), drivability program 114 restricts (310) operation of a vehicle component associated with the score reduction.

Drivability program 114 restricts (310) operation of a vehicle component associated with the score reduction. For a vehicle related score reduction, drivability program 114 can restrict a maximum speed of the vehicle responsive to determining the score reduction in the vehicle related category was due to a low measure of tread wear on the tires and a low measure of brake pad material. An amount drivability program 114 restricts the maximum speed of the vehicle can be based on the environmental data, where a maximum speed restriction is greater when the environment data indicates inclement weather when compared to the environmental data indicating ideal driving conditions (e.g., clear skies and 10 mile visibility). Drivability program 114 restricts the maximum speed of the vehicle by instructing the Engine Control Unit (e.g., ECU 116) to limit engine performance to match the maximum speed for the vehicle as restricted by drivability program 114.

For a driver related score reduction, drivability program 114 can restrict a rate of acceleration for the vehicle responsive to determining the score reduction in the driver related category was due to a speed infraction by the driver and/or an aggressive driving infraction by the driver. Drivability program 114 restricts the acceleration of the vehicle by instructing the Transmission Control Unit (e.g., TCU 118) to lower a gear shift point for each gear of the transmission (e.g., Transmission 126), thus restricting the acceleration of the vehicle. Drivability program 114 has the ability to select a restricted programming map stored in the TCU which includes a 3000 RPM (Revolutions Per Minute) shift point for the transmission, to ensure the vehicle does not aggressively accelerate. Additionally, having a 3000 RPM limit for the final gear in the transmission, limits the maximum speed for the vehicle as well. In another example, drivability program 114 can restrict a volume and one or more functions of the media system responsive to determining the score reduction in the driver related category was due to a driving while distracted infraction by the driver. Drivability program 114 restricts volume and one or more functions of the media system (e.g., media system 128) to assist in maintaining the attention of the driver during the vehicle operations.

For an environmental related score reduction, drivability program 114 can restrict a maximum speed and rate of acceleration for vehicle responsive to determining the score reduction in the environmental related category was due to inclement weather. In another embodiment, drivability program 114 can restrict particular settings on a vehicle such as a Traction Control System (TCS), Stability Control System (SCS), and Anti-Lock Braking System (ABS). For example, if drivability program 114 determines there is inclement weather (i.e., snow), drivability program 114 can restrict settings for a previously mentioned system to prevent the driver from disabling the system which could decrease the drivability score even further. Alternatively, if any one of the previously mentioned systems was disabled by the driver, drivability program 114 activates each of the previously mentioned systems.

In other embodiments, rather than restricting operations of vehicle components, drivability program 114 activates one or more components on the vehicle based on the source of the drivability score reduction. In one example, if the score reduction is environmental related, drivability program 114 activates the headlights and fog lights on the vehicle to assist in allowing the vehicle to be more visible in inclement weather (e.g., fog). In another example, if the score reduction is vehicle related, drivability program 114 increases a sensitivity of an Anti-Lock Braking System to ensure that worn tires on the vehicle do not lockup during braking. Drivability program 114 has the ability to process all the score reduction related sources and take an action to provide an optimal driving experience based on the drivability score.

Drivability program 114 displays (312) the drivability score. In this embodiment, drivability program 114 displays the drivability score in the media system of the vehicle, such as an central infotainment screen or in a heads-up display that is projected on the windscreen. Drivability program 114 can display one or more of the drivability score, each of the one or more identified sources for drivability score reduction, and one or more actions taken as a result of the drivability score falling below a drivability score threshold. Drivability program 114 can also display a list of one or more recommendations to take based on the drivability score, such as, a recommendation to change tires or server the brake pads. In another embodiment, drivability program 114 has the ability to send the drivability score to a client device of the driver of the vehicle, for further evaluation of the drivability score at a later time when the driver is no longer operating the vehicle.

Figure 4:
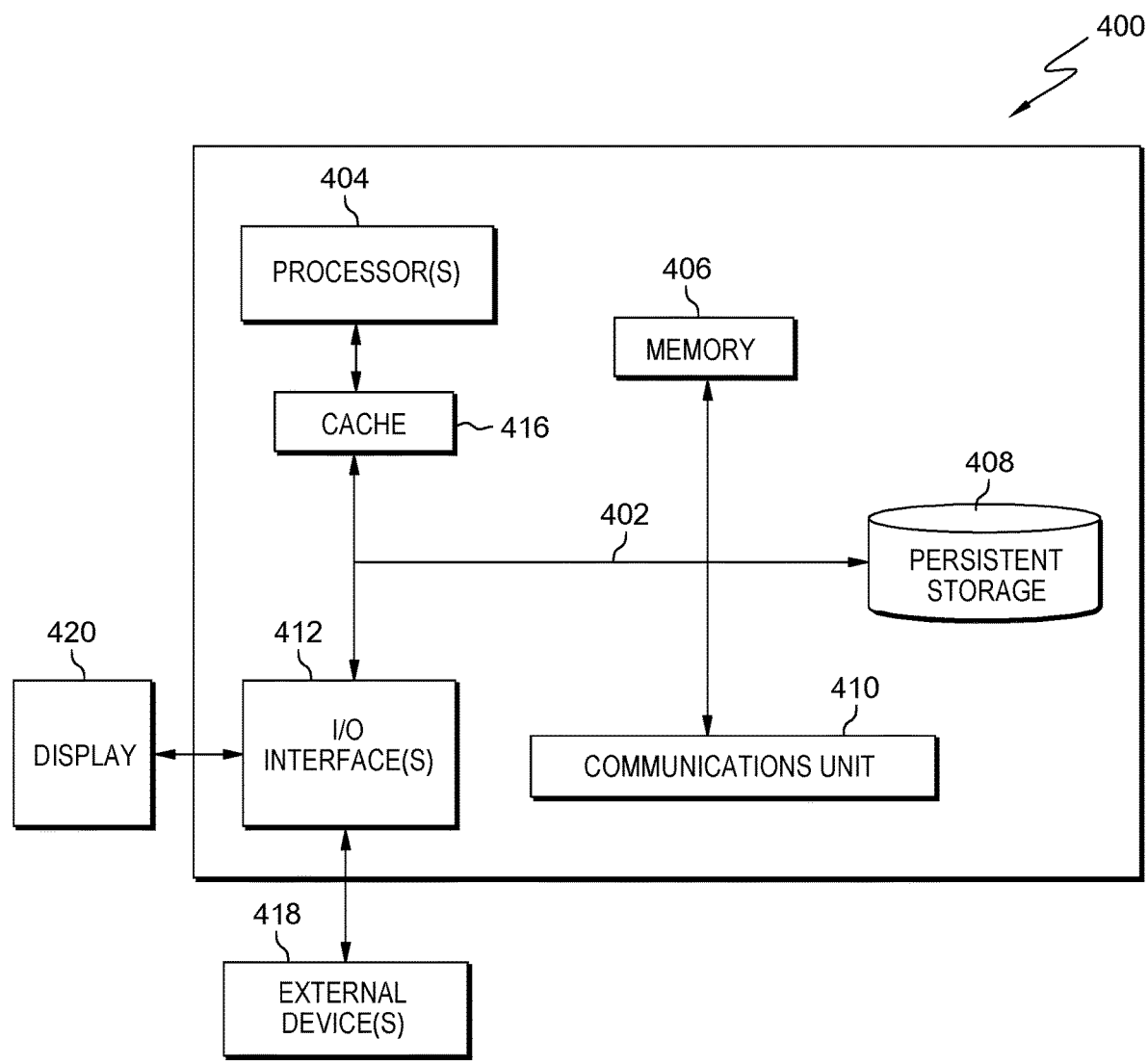
FIG. 4 is a block diagram of components of a computer system, such as the server computer of FIG. 1, in accordance with an embodiment of the present invention.

FIG. 4 depicts computer system 400, where server computer 102 and electronic device 104 are examples of a system that includes parts drivability program 114A and 114B, respectively. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 402 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 406 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    responsive to determining a vehicle is operational, receiving, by one or more processors, vehicle data associated with the operational vehicle;
    receiving, by the one or more processors, driver data associated with a driver of the operational vehicle;
    receiving, by the one or more processors, environmental data associated with a location for the operational vehicle;
    calculating, by the one or more processors, a drivability score based on the vehicle data, the driver data, and the environmental data, wherein the drivability score is a measure of optimal driving conditions;
    responsive to determining the drivability score is below a drivability score threshold, identifying, by the one or more processors, one or more sources for a reduction in the drivability score;
    responsive to determining the one or more sources for the reduction in the drivability score is related to the operational vehicle, determining, by the one or more processors, to restrict a maximum speed of the operational vehicle; and
    instructing, by the one or more processors, an Engine Control Unit associated with the operational vehicle to limit engine performance to match the maximum speed for the operational vehicle.

2. The method of claim 1, further comprises:
    identifying, by the one or more processors, one or more sources for a reduction in the drivability score;
    responsive to determining the one or more sources for the reduction in the drivability score is related to the driver, determining, by the one or more processors, to restrict an acceleration rate of the operational vehicle; and
    instructing, by the one or more processors, a Transmission Control Unit associated with the operational vehicle to lower a gear shift point for each gear of the transmission, wherein a restricted programming map stored in the Transmission Control Unit limits the acceleration rate and a maximum speed of the operational vehicle.

3. The method of claim 1, wherein further comprises:
    identifying, by the one or more processors, one or more sources for a reduction in the drivability score; and
    responsive to determining the one or more sources for the reduction in the drivability score is related to the driver, restricting, by the one or more processors, a volume level and one or more functions for a media system of the operational vehicle.

4. The method of claim 1, wherein further comprises:
    identifying, by the one or more processors, one or more sources for a reduction in the drivability score; and
    responsive to determining the one or more sources for the reduction in the drivability score is environment related, determining, by the one or more processors, to restrict settings for at least one systems selected from a group consisting of: Traction Control System (TCS), Stability Control System (SCS), and Anti-Lock Braking System (ABS), wherein restricting the settings includes preventing the at least one system from being turned off.

5. The method of claim 1, wherein receiving the environmental data associated with a location for the operational vehicle further comprises:
    receiving, by the one or more processors, an environment related warning message for the location of the operational vehicle; and
    displaying, by the one or more processors, the environment related warning message to the driver via a media system on the operational vehicle.

6. The method of claim 1, further comprising:
    displaying, by the one or more processors, the drivability score to the driver via a media system on the operational vehicle, along with one or more recommendations to take based on a reduction to the drivability score.

7. A computer program product comprising:
    one or more non-transitory computer readable storage media and program instructions stored on at least the one of the one or more non-transitory computer readable storage media, the program instructions comprising:
    program instructions to, responsive to determining a vehicle is operational, receive vehicle data associated with the operational vehicle;
    program instructions to receive driver data associated with a driver of the operational vehicle;
    program instructions to receive environmental data associated with a location for the operational vehicle;
    program instructions to calculate a drivability score based on the vehicle data, the driver data, and the environmental data, wherein the drivability score is a measure of optimal driving conditions;
    program instructions to, responsive to determining the drivability score is below a drivability score threshold, identify one or more sources for a reduction in the drivability score;
    responsive to determining the one or more sources for the reduction in the drivability score is related to the operational vehicle, determine to restrict a maximum speed of the operational vehicle; and
    instruct an Engine Control Unit associated with the operational vehicle to limit engine performance to match the maximum speed for the operational vehicle.

8. The computer program product of claim 7, further comprises program instructions, stored on the one or more non-transitory computer readable storage media, which when executed by a processor, cause the processor to:
    identify one or more sources for a reduction in the drivability score;
    responsive to determining the one or more sources for the reduction in the drivability score is related to the driver, determine to restrict an acceleration rate of the operational vehicle; and
    instruct a Transmission Control Unit associated with the operational vehicle to lower a gear shift point for each gear of the transmission, wherein a restricted programming map stored in the Transmission Control Unit limits the acceleration rate and a maximum speed of the operational vehicle.

9. The computer program product of claim 7, further comprises program instructions, stored on the one or more non-transitory computer readable storage media, which when executed by a processor, cause the processor to:
    identify one or more sources for a reduction in the drivability score; and
    responsive to determining the one or more sources for the reduction in the drivability score is related to the driver, restrict a volume level and one or more functions for a media system of the operational vehicle.

10. The computer program product of claim 7, further comprises program instructions, stored on the one or more non-transitory computer readable storage media, which when executed by a processor, cause the processor to:
    identify one or more sources for a reduction in the drivability score; and
    responsive to determining the one or more sources for the reduction in the drivability score is environment related, determine to restrict settings for at least one systems selected from a group consisting of: Traction Control System (TCS), Stability Control System (SCS), and Anti-Lock Braking System (ABS), wherein restricting the settings includes preventing the at least one system from being turned off.

11. The computer program product of claim 7, wherein receiving the environmental data associated with a location for the operational vehicle further comprises program instructions, stored on the one or more non-transitory computer readable storage media, which when executed by a processor, cause the processor to:
    receive an environment related warning message for the location of the operational vehicles; and
    display the environment related warning message to the driver via a media system on the operational vehicle.

12. The computer program product of claim 7, further comprising program instructions, stored on the one or more non-transitory computer readable storage media, which when executed by a processor, cause the processor to:
    display the drivability score to the driver via a media system on the operational vehicle, along with one or more recommendations to take based on a reduction to the drivability score.

13. A computer system comprising:
    one or more computer processors;
    one or more computer readable storage media; and
    program instructions stored on the one or more computer readable storage media for execution by at least one of the one or more computer processors, the program instructions comprising:
    program instructions to, responsive to determining a vehicle is operational, receive vehicle data associated with the operational vehicle;
    program instructions to receive driver data associated with a driver of the operational vehicle;
    program instructions to receive environmental data associated with a location for the operational vehicle;
    program instructions to calculate a drivability score based on the vehicle data, the driver data, and the environmental data, wherein the drivability score is a measure of optimal driving conditions; and
    program instructions to, responsive to determining the drivability score is below a drivability score threshold, identify one or more sources for a reduction in the drivability score;
    responsive to determining the one or more sources for the reduction in the drivability score is related to the operational vehicle, determine to restrict a maximum speed of the operational vehicle; and
    instruct an Engine Control Unit associated with the operational vehicle to limit engine performance to match the maximum speed for the operational vehicle.

14. The computer system of claim 13, further comprises program instructions, stored on the one or more computer readable storage media, which when executed by the one or more processors, cause the one or more processors to:
- identify one or more sources for a reduction in the drivability score;
- responsive to determining the one or more sources for the reduction in the drivability score is related to the driver, determine to restrict an acceleration rate of the operational vehicle; and
- instruct a Transmission Control Unit associated with the operational vehicle to lower a gear shift point for each gear of the transmission, wherein a restricted programming map stored in the Transmission Control Unit limits the acceleration rate and a maximum speed of the operational vehicle.

15. The computer system of claim 13, further comprises program instructions, stored on the one or more computer readable storage media, which when executed by the one or more processors, cause the one or more processors to:
- identify one or more sources for a reduction in the drivability score; and
- responsive to determining the one or more sources for the reduction in the drivability score is related to the driver, restrict a volume level and one or more functions for a media system of the operational vehicle.

16. The computer system of claim 13, further comprises program instructions, stored on the one or more computer readable storage media, which when executed by the one or more processors, cause the one or more processors to:
- identify one or more sources for a reduction in the drivability score; and
- responsive to determining the one or more sources for the reduction in the drivability score is environment related, determine to restrict settings for at least one systems selected from a group consisting of: Traction Control System (TCS), Stability Control System (SCS), and Anti-Lock Braking System (ABS), wherein restricting the settings includes preventing the at least one system from being turned off.

17. The computer system of claim 13, wherein receiving the environmental data associated with a location for the operational vehicle further comprises program instructions, stored on the one or more computer readable storage media, which when executed by the one or more processors, cause the one or more processors to:
- receive an environment related warning message for the location of the operational vehicle; and
- display the environment related warning message to the driver via a media system on the operational vehicle.

* * * * *